United States Patent [19]

Rouchon et al.

[11] Patent Number: 5,200,622
[45] Date of Patent: Apr. 6, 1993

[54] SELF-CHECKED OPTRONIC SYSTEM OF INFRA-RED OBSERVATION AND LASER DESIGNATION POD INCLUDING SUCH A SYSTEM

[75] Inventors: Jean-Marc Rouchon, Orsay; Jean-Louis Ricci, Paris, both of France

[73] Assignee: Thomson-CSF, Puteaux, France

[21] Appl. No.: 801,900

[22] Filed: Dec. 3, 1991

[30] Foreign Application Priority Data

Dec. 4, 1990 [FR] France ............................ 90 15158

[51] Int. Cl.⁵ .............................................. H04N 5/33
[52] U.S. Cl. ................................. 250/334; 250/252.1
[58] Field of Search ............... 250/330, 352, 252.1 A, 250/334, 347

[56] References Cited

U.S. PATENT DOCUMENTS

| | | | |
|---|---|---|---|
| 3,854,821 | 12/1974 | Thompson | 250/341 |
| 4,422,758 | 12/1983 | Godfrey et al. | 250/341 |
| 4,707,736 | 11/1987 | de Virel | 250/334 |
| 4,777,366 | 11/1988 | Marx | 250/330 |
| 5,047,638 | 9/1991 | Cameron et al. | 250/330 |

FOREIGN PATENT DOCUMENTS

| | | |
|---|---|---|
| 0217692 | 4/1987 | European Pat. Off. . |
| 0262322 | 4/1988 | European Pat. Off. . |

*Primary Examiner*—Carolyn E. Fields
*Attorney, Agent, or Firm*—Oblon, Spivak, McClelland, Maier & Neustadt

[57] ABSTRACT

A self-check electronic system for infra-red observation includes a hood having a first port transparent to infra-red radiation and a second port which is reflected through infra-red radiation and the hood can be rotated so that the second port is perpendicular to an infra-red detector optical sighting line so that a self-checking operation determining whether the optical system is aligned may be performed.

7 Claims, 3 Drawing Sheets

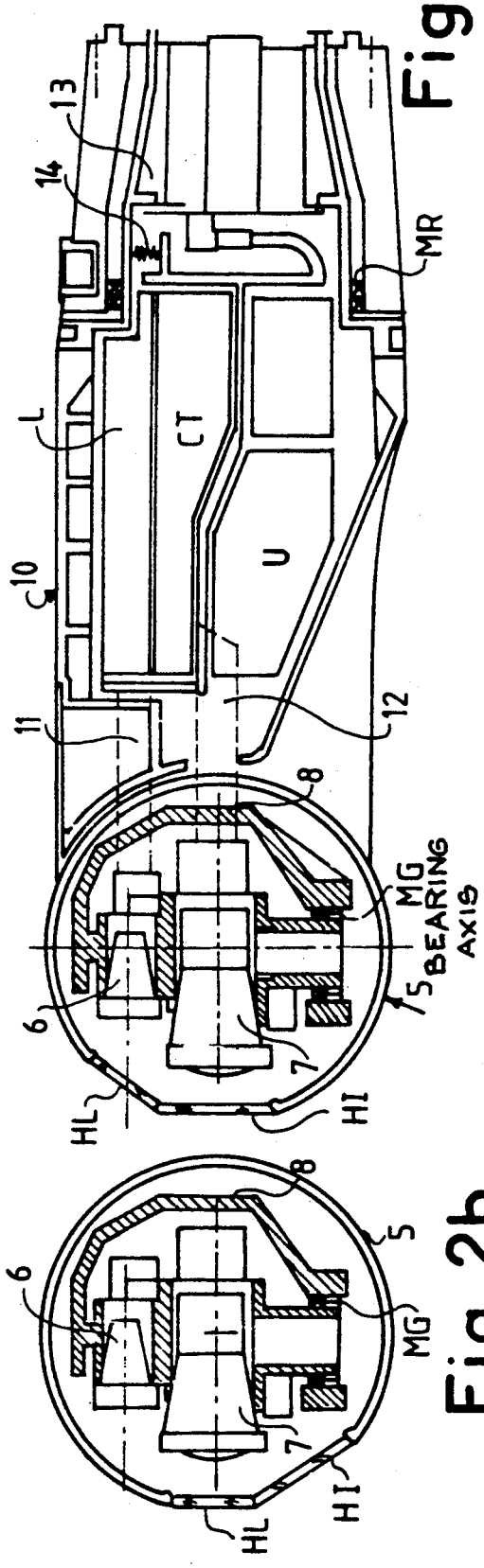
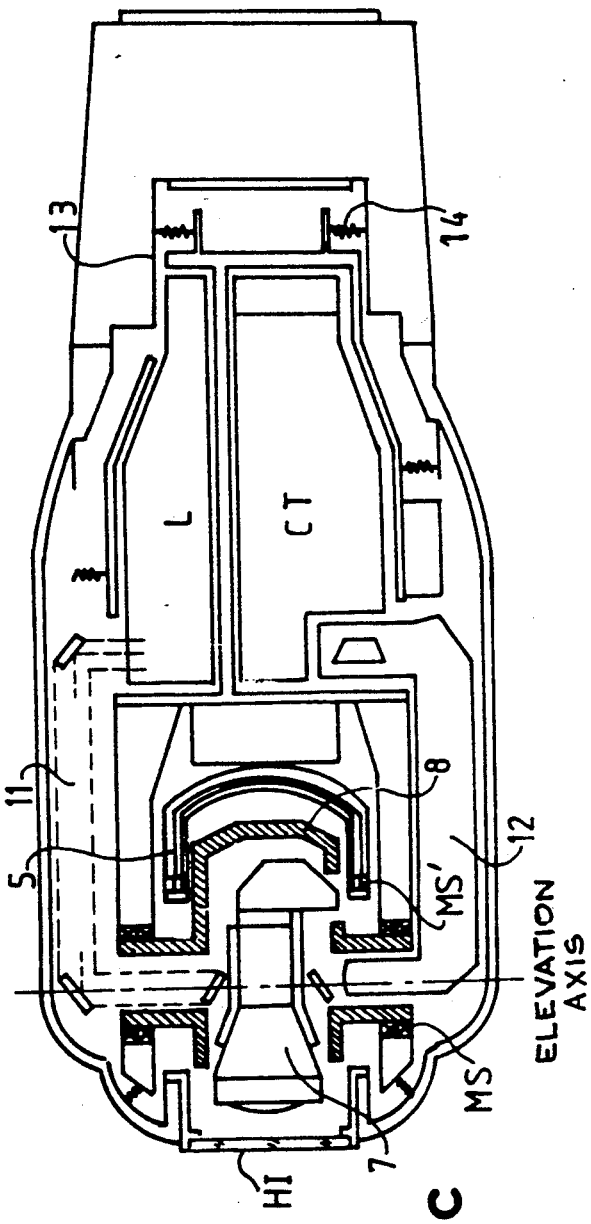
Fig. 2a
Fig. 2b
Fig. 2c

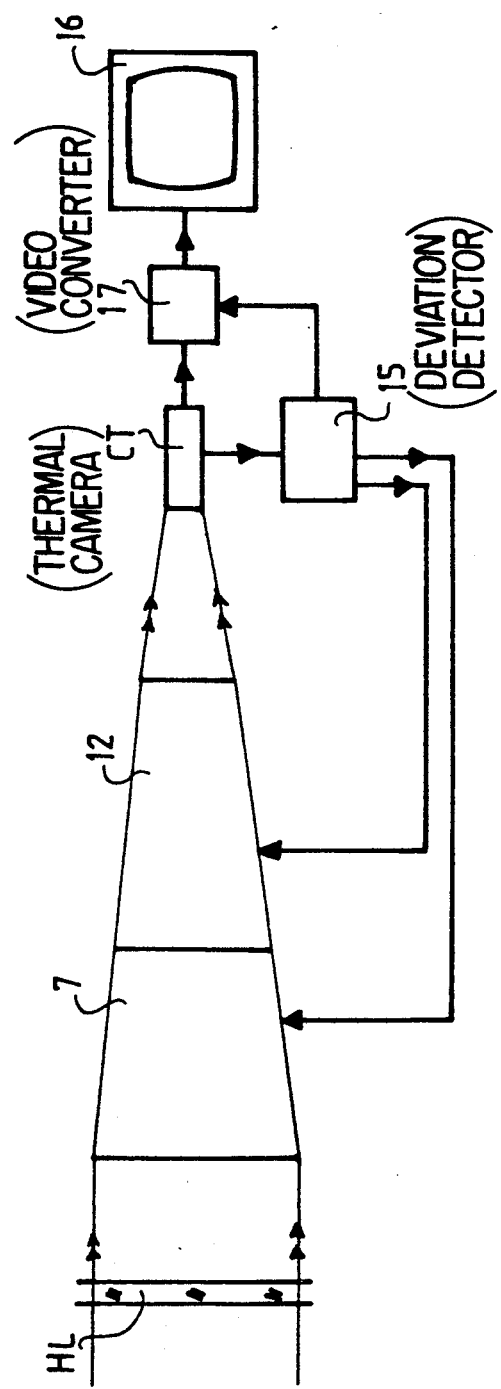

SELF-CHECKED OPTRONIC SYSTEM OF INFRA-RED OBSERVATION AND LASER DESIGNATION POD INCLUDING SUCH A SYSTEM

BACKGROUND OF THE INVENTION

1. Field of the Invention

The invention relates to the field of the observation and formation of images in an infrared radiation band and is aimed, more particularly, at a self-checked optronic system for observation in such a band.

Optronic systems such as these, mounted on board an aircraft, carry out angular tracking by passive day-and-night imaging, respectively using Vidicon or TV type tubes for visible radiation and FLIR (forward looking infra-red) type tubes for infra-red radiation.

This imaging makes it possible to supply servo-mechanisms for positional servo-control with information on angular deviation between the direction of the target and the direction of the sighting axis. In optronic systems for target designation by laser beam guidance, the direction of the sighting axis is furthermore indistinguishable from the laser illumination axis, the target being then illuminated with precision by the laser.

The invention, which can be applied to any optronic system of infra-red observation, is described more precisely and illustrated in application to an optronic laser designation pod with several optical channels.

2. Description of the Related Art

As shown schematically in FIG. 1, the opto-mechanical structure of a standard laser designation pods typically includes a multi-spectral input port 1 and a common optical channel defined by a first gyro-stabilized optical head system 2, for example a Cassegrain type assembly as shown, to provide for a angular range of shift in two axes (relative bearing/elevation), and a second image-offset system with 3, 4 or 5 mirrors, to keep the final position of the center of the image in a plane of detection. The separation of the infrared/visible/laser channels takes place only subsequently, by means of separators M1 and M2. If necessary, there may be a laser telemetry channel. The sighting beam from the laser L, represented by a double-headed arrow in FIG. 1, is collimated by means of an adapter 4 before being directed to the common optical channel. The incident observation beam, represented by a single-headed arrow, is analyzed by being focused on the thermal camera CT, the tube T and, as the case may be, the laser telemeter TL, after separation (mirrors M1, M2 and M3) and focusing (lenses L1, L2 and L3) respectively on the infra-red, visible and laser channels.

This type of optical-mechanical-optronic structure, which is found for example in the patents Nos. FR 84 16033 or U.S. Pat. No. 3,854,821, is conveyed in a frame configured in the form of a cylindrical pod mounted beneath the aircraft.

Other pods with separate optical channels have also been made, each channel having a port, an optical head system and an image offset optical system.

SUMMARY OF THE INVENTION

Under these conditions, an object of the invention is a self-checked optronic system for infra-red observation, designed for a laser designation pod with a plurality of optical channels, the channels being separate or indistinguishable from one another.

Now, an optronic system for infra-red observation is formed by complex and sensitive opto-mechanical elements. It is thus advantageous to make a comprehensive test, in a preliminary automatic control phase, of all the elements used on the infra-red detection channel.

A self-checking operation such as this is achieved, in the context of the present invention, by the returning, to the infra-red detector, of its own image. The effect thus exploited (called the "Narcissus effect") is an effect that is usually combatted for it gives a parasitic image that is superimposed on the useful image.

More precisely, according to the invention, there is proposed a self-checked optronic system for infra-red observation comprising a port transparent to radiation in an infra-red band and borne by a hood, an optical system for the deflection and formation of images having a sighting line perpendicular to this port and a detector sensitive in the infra-red band, wherein said system further comprises a second input port mounted on the same hood and reflecting the radiation of said infra-red band, and means for tilting the hood so as to position the second port perpendicularly to the sighting line for the self-checking operation.

Another object of the invention is a pod for the designation of targets by laser guidance, comprising a self-checking infra-red observation system such as this.

BRIEF DESCRIPTION OF THE DRAWINGS

Other features and advantages of the present invention shall appear from the following description, made with reference to the appended figures, of which:

FIGS. 2a, 2b and 2c show a structure of the self-checking device according to the invention, for a laser designation system with a plurality of optical channels, along a first sectional plane respectively before and after the tilting of the follower hood (FIGS. 2a and 2b) and along a sectional plane orthogonal to the previous one FIG. 2c);

FIG. 3 is a drawing showing the different elements checked by the system according to the invention, and its means constituting a device such as this.

DESCRIPTION OF THE PREFERRED EMBODIMENTS

Figure 1:
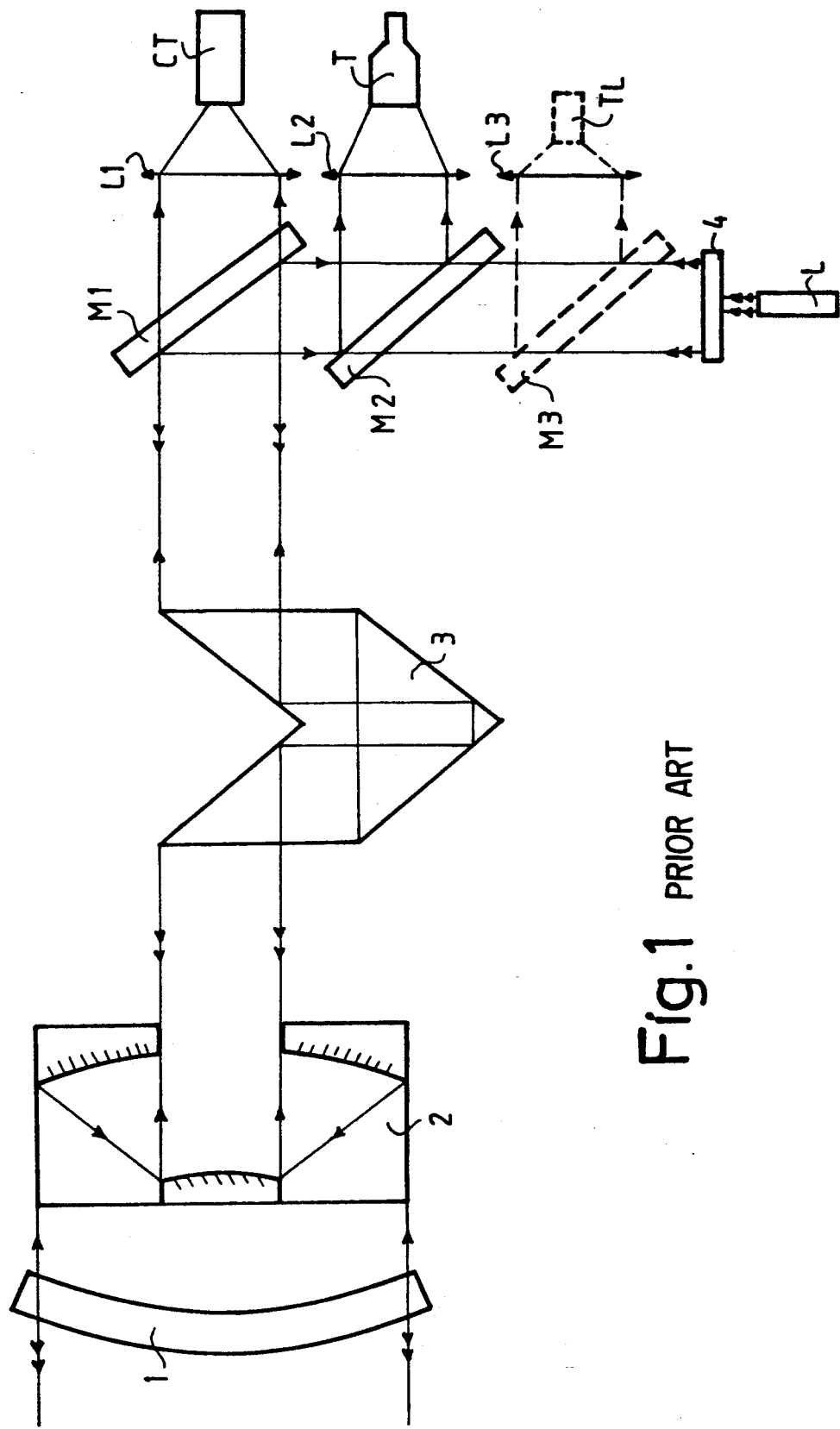
FIG. 1 is a drawing showing the different elements of a known system of laser designation with a common optical channel (already commented upon)

FIGS. 2a and 2c show the structure of a laser designation pod with a plurality of optical paths, fitted out with a self-checked optronic system for infra-red observation according to the invention, these two figures corresponding to orthogonal sectional planes.

In this structure, the target sighting/detection line, which is of a known type, is made up of:

- a spherical follower hood 5 on which there are mounted two input ports HL and HI facing two afocal optical heads 6 and 7 for the deflection of the sighting line for the visible/laser channel and the infra-red channel respectively. These two heads 6 and 7 are mounted so as to be superimposed within the hood 5 on one and the same housing 8 that shifts in elevation/relative bearing by means of motors MS and MG; other elevation/relative bearing motors MS' and MG' synchronized with the motors for shifting the housing 8 provide for tracking the shift of the follower hood 5;
- a body 10 comprising two image offset optical assemblies 11 and 12 formed by reflecting and focusing mirrors positioned respectively on the visible/laser channel and on the infra-red channel, an optical assembly constituted firstly by a laser sighting source L and, possibly, by a visible imaging tube (not shown) and, secondly, by a thermal camera CT. The assembly formed by these elements is suspended by means of damping devices 14 within the casing 10, and is attached to a roll thruster providing for a rolling shift of the opto-mechanical assembly by means of the annular motor MR. The port HI, the afocal optical head 7, the optical offset assembly 12 and the infra-red detector form the optronic infra-red observation system of the pod.

The structure of the designation pod enables the opto-mechanical elements to be completely protected from external strains (due to vibration and thermodynamic effects) owing to the positioning of the suspension, and also makes it possible, by the combination of the roll/elevation motions, to deflect the sighting lines (i.e. laser sighting and visible/infra-red imaging) practically throughout space.

The self-checking of the optronic system for infra-red observation is done by the interposition, in the infra-red optical path, of a reflecting element to send the infra-red detector its own image by the application of the Narcissus effect. The detected image is analyzed electronically and observed on a display system.

The reflecting element may be a retractable element, such as a pivoting mirror, that would get interposed in the optical path of the infra-red channel. However, the positioning and the presence of a mirror such as this raises many problems related to the need for an additional movable carrier structure and a driving and control system for this structure, the problem of space factor, the precise positioning of the mirror, etc. In the embodiment shown, the optronic system for infra-red observation brings into play, as a retractable element, an element mounted on the hood of the pod with two channels, infra-red and laser, namely its laser input port. The use of a port such as this averts the problems raised: in the self-control phase, the hood is tilted as shown in FIG. 2b which shows only the input hood and the elements that it contains. The port HL is positioned perpendicularly to the optical axis of the afocal input system of the infra-red channel by the sending, to the control unit U, of an instructed value activating the adequate angular shift of the follower hood 5 by means of the elevation motor MS' of the follower hood. By the self-collimation of the light beam on the port HL, the infra-red detector's own cold image can thus be analyzed on a hotter background. Such a rotation of the follower hood, desynchronized from the rotation of the optical deflection means, is designed to come into play in other circumstances through the implementing of these very same tilting means: thus, when the pod is not operational, the ports may be positioned towards the rear in order to be protected (from a hostile environment, pluvial erosion etc.).

The means to analyze the image of the detector in this self-control phase are illustrated with reference to FIG. 3. They comprise the following by connection to the thermal camera CT:

firstly, a deviation measurement system 15 that computes the deviation between the ideal position, in the system, of the image of the infra-red detector and its real position;

secondly, a display screen 16 after the signal coming from the camera CT as passed through an electronic circuit 17 for conversion into video mode, this screen 16 enabling a visual control of the image of the infra-red detector with respect to the rest of the image, through the substantial difference in temperature.

Thus, any fault or deformation of the optical systems for the control of the sighting line (image offset and focusing optical systems 12) on the one hand, and any fault in the electronic systems (heat camera CT video processing circuit 17) on the other hand, is detected.

The first series of faults, of an optical order, is revealed by the deviations in the position of the infra-red detector, computed by the deviation measurement system M. To correct these faults, the deviation measurement system 15 sends a deviation signal to an alignment control circuit: this is either a circuit to control the motors for the elevation/relative bearing scan motions of the housing 8 or a circuit to control a swivelling mirror of the optical offset system 12, for example a mirror mounted on piezoelectrical shims. The deviation measurement system may compare the memorized position of the infra-red detector with the real position, to obtain a deviation signal.

The second series of faults, of an optoelectronic order, results from the level of the video signal transmitted and checked by display on the screen 15. It is thus possible directly to identify the faulty working of a cell of the infra-red detector on the screen or indirectly, by the black/white contrast inversion test, to identify a fault of an element of the electronic processing line (sampler, filter, amplifier).

The invention is not limited to the embodiment described and represented: the self-controlled system of infra-red observation according to the invention can be applied to any infra-red surveillance system. In particular, it can be applied in an infra-red surveillance system having no laser channels, and hence no laser port, it is necessary to provide for an additional element, reflecting the infra-red radiation, that is mounted on the hood and, as in the system already described, for means to tilt the hood to position the mirror perpendicularly to the infra-red sighting line for the self-checking operation.

What is claimed is:

1. A self-checked optronic system for infra-red observation, comprising:

a hood;

a first port transparent to radiation in an infra-red band and borne by the hood, an optical system for the deflection and formation of infra-red images having a first sighting line perpendicular to the first port when the hood is in a first position and a detector sensitive in the infra-red band, a second port which is mounted on the hood, is reflective to radiation of said infra-red band, and is positioned along a second sighting line which is not coaxial with the first sighting line when the hood is in the first position, and means for rotating the hood so as to position the second port perpendicularly to the first sighting line in order to carry out a self-checking operation by sending back an image of the detector to the detector.

2. An optronic system according to claim 1, further comprising;

a display screen;

an electronic processing circuit;

wherein the infra-red detection signal provided by the infra-red detector is displayed on the display screen after conversion into a video signal in the electronic processing circuit, and a deviation measurement system wherein the infra-red detector is connected also to the deviation measurement system which comprises means to measure the deviation in position between the image and of the detector as identified and displayed by the optronic system and a reference image of the detector as memorized by the deviation measurement system, and wherein the deviation measurement system computes and sends deviation signals to an optical deflection means for deflecting radiation propagating toward the infra-red detector, and to the electronic processing circuit.

3. An optronic system according to claim 2, wherein the deviation measurement system sends a deviation signal to a reflecting mirror of the optical deflection means.

4. A pod for the designation of targets by laser guidance, comprising:
   an infra-red detection first channel including a self-checked optronic system for infra-red observation according to one of claims 1 or 3, said first channel further comprising an image formation means for forming an image of infra-red signals, and
   a laser guidance second channel comprising a laser transmission means for transmitting a laser beam, wherein each of these channels comprises an input port, an optical deflection and image offset device defining the same sighting line for both channels, wherein the element reflecting the radiation of the infra-red band is the port of the laser channel rotated perpendicularly to the sighting line for the self-checking operation, and wherein the infra-red detector is fitted to the image formation means.

5. An optronic system, comprising:
   a hood having first and second operating positions, comprising a first port having a first flat surface, wherein said first port is transparent to infra-red radiation and a second port having a second flat surface, said second port is transparent to non-infra-red radiation be is reflective to infra-red radiation;
   a first optical system for deflection and formation of an infra-red image, comprising a first sighting line which intersects with and is perpendicular to the first flat surface when the hood is in the first operating position;
   an infra-red detector disposed at one end of the first sighting line;
   a second optical system for deflection and formation of a non-infra-red image, comprising a second sighting line which is not coaxial with said first sighting line and intersects with and is perpendicular to the second flat surface when the hood is in the first position; and
   wherein said first sighting line is perpendicular to and intersects with the second flat surface when the hood is in said second operating position, thereby allowing determination of deviations from alignment of the infra-red detector and the first sighting line.

6. A system according to claim 5, further comprising:
   means for rotating said hood; and
   wherein said hood has a third storage position in which all ports of the hood are enclosed by elements of the system so that they are protected from being damaged by external environmental factors.

7. A system according to claim 5, further comprising:
   a pod for designation of targets comprising a laser guidance system attached to the hood.

* * * * *